United States Patent
Bubeck

[19]

[11] Patent Number: 6,138,637
[45] Date of Patent: Oct. 31, 2000

[54] INTERNAL COMBUSTION ENGINE WITH DIRECT FUEL INJECTION

[75] Inventor: Günther Bubeck, Schorndorf, Germany

[73] Assignee: DaimlerChrysler AG, Stuttgart, Germany

[21] Appl. No.: 08/932,768

[22] Filed: Sep. 18, 1997

[51] Int. Cl.[7] .............................. F02B 3/02; F02B 17/00
[52] U.S. Cl. ................................. 123/295; 123/169 PA; 123/298; 123/305
[58] Field of Search .......................... 123/169 PA, 276, 123/295, 298, 305

[56] References Cited

U.S. PATENT DOCUMENTS

| | | | |
|---|---|---|---|
| 2,058,487 | 10/1936 | Mock | 123/298 |
| 4,091,774 | 5/1978 | Kamiya | 123/169 PA X |
| 4,686,941 | 8/1987 | Ariga | 123/26 |
| 4,721,081 | 1/1988 | Krauja et al. | 123/298 |
| 5,335,635 | 8/1994 | Kadoi et al. | 123/295 |

FOREIGN PATENT DOCUMENTS 30 12 022  4/1983  Germany .

*Primary Examiner*—Tony M. Argenbright
*Attorney, Agent, or Firm*—Klaus J. Bauch

[57] ABSTRACT

In an internal combustion engine with direct fuel injection having a cylinder, a piston and a cylinderhead defining together a combustion chamber, a fuel injector with a fuel injection nozzle is mounted in the cylinder head for delivering fuel from the fuel injection nozzle into the combustion chamber so as to form a mixture cone. A spark plug is mounted in a spark plug sleeve disposed in the cylinder head and projects into the combustion chamber beyond the spark plug electrodes and into the mixture cone so as to form at its front end adjacent the spark plug electrodes an open ignition chamber in which part of the rich fuel mixture of the fuel mixture cone is collected for ignition by the spark plug.

19 Claims, 1 Drawing Sheet

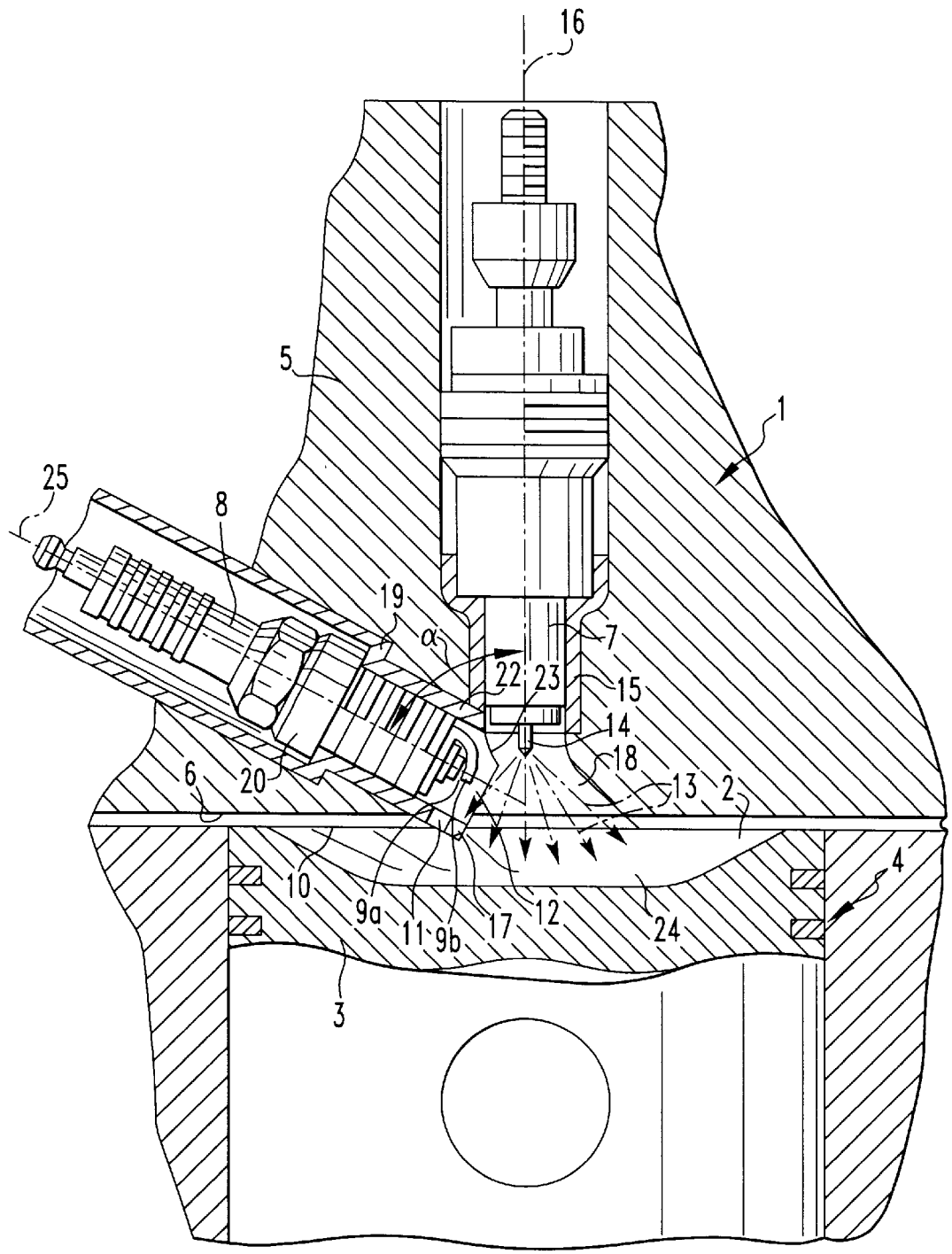

INTERNAL COMBUSTION ENGINE WITH DIRECT FUEL INJECTION

BACKGROUND OF THE INVENTION

The invention resides in an internal combustion engine with direct fuel injection having a cylinder closed by a cylinder head which includes a fuel injector for injecting fuel into the cylinder to generate a combustible mixture with air in the cylinder which is ignited by the spark of a spark plug.

In internal combustion engines with stratified charge direct fuel injection, fuel is injected by an injector directly into the combustion chamber of the cylinder in the area adjacent the spark plug. The mixture formed thereby is a relatively rich fuel/air mixture which can be easily ignited and whose combustion increases the temperature and pressure in the relatively lean mixture layers. This insures combustion of the leaner mixture while fuel consumption is reduced particularly in a low load engine operating range. The injector and the spark plug are arranged in the wall of the cylinder head delimiting the combustion chamber at an angle with respect to each other wherein the injector is preferably arranged in the center of the combustion chamber. Such an arrangement prevents that part of the fuel injected into the combustion chamber impinges directly onto the cylinder wall as this would cool, and accumulate, fuel on the cylinder wall resulting in an incomplete combustion and an increase in the emission of harmful products from the internal combustion engine.

DE 43 24 642 A1 discloses such a stratified charge direct fuel injection internal combustion engine with an injection nozzle arranged vertically in the center of the cylinder head. The injection nozzle injects fuel into the combustion chamber in a cone-like pattern whereby a combustible mixture is formed with combustion air which is separately supplied into the combustion chamber. The spark plug for the ignition of the mixture extends far into the combustion chamber such that the spark plug electrodes reach into the fuel cone and are wetted by fuel with each injection procedure and are cooled thereby. However, in time, deposits, particularly carbon deposits, are formed on the electrodes whereby the development of a spark between the electrodes is inhibited and the spark plug may finally fail completely.

It is therefore the principal object of the present invention to provide a direct fuel injection internal combustion engine which operates in an optimal manner over a long period of time. It is also an object of the invention to provide an internal combustion engine with direct fuel injection which generates in the combustion chamber a stratified charge which can be reliably ignited by the spark plug electrodes also at the edge of, or outside, the rich fuel mixture cone.

SUMMARY OF THE INVENTION

In an internal combustion engine with direct fuel injection comprising a cylinder, a piston and a cylinderhead defining together a combustion chamber, a fuel injector with a fuel injection nozzle is mounted in the cylinder head for delivering fuel from the fuel injection nozzle into the combustion chamber in the form of a mixture cone and a spark plug is mounted in a spark plug sleeve disposed in the cylinder head and projecting into the combustion chamber beyond the spark plug electrodes and into the mixture cone so as to form at its front end adjacent the spark plug electrodes an open ignition chamber in which part of the fuel mixture of the mixture cone is collected for ignition by the spark plug.

Since the spark plug is received in a sleeve which extends into the combustion chamber, the electrodes of the spark plug are not directly exposed to the fuel injected into the combustion chamber. They are therefore protected and, consequently, will not form carbon deposits over a long period of operation. At the end of the spark plug sleeve in the combustion chamber, the sleeve forms around the electrodes of the spark plug an ignition chamber, which is open toward the fuel cone generated by the fuel injection nozzle. Preferably, the spark plug sleeve opening is disposed at the edge of the injected fuel mixture cone so that, during the compression stroke of the piston, a relatively rich fuel/air mixture is formed in the ignition chamber which can be easily ignited and provides for safe combustion of the stratified charge. The mixture is relatively rich at the spark plug, but may otherwise be lean whereby fuel consumption and emissions are both low. Furthermore, the provision of an ignition chamber is quite advantageous with regard to a mass production of the internal combustion engine, particularly a multi-cylinder internal combustion engine, since it eliminates the need for an adjustment of the injection parameters when, with an exchange of injection nozzles, the mixing conditions in the fuel cone generated by the new injection nozzle are changed. Even with somewhat changed mixing conditions an easily ignitable mixture volume is formed in the ignition chamber.

Preferably, the spark plug sleeve is so arranged that its axis extends into the cylinderhead at an inclination angle $\alpha$ with respect to the longitudinal axis of the injection nozzle, which angle $\alpha$ is greater than the cone angle of the fuel mixture cone. In this way, a wall portion of the sleeve forming the ignition chamber remote from the injection nozzle projects into the fuel mixture cone area so that, during fuel injection, a small amount of the fuel mixture cone impinges onto that wall portion and enters the ignition chamber. The volume of the ignition chamber is part of the combustion chamber volume and is normally disposed in the lean mixture area of the combustion chamber outside the fuel cone.

However, with the fuel collected in the ignition chamber by the projecting wall portion of the spark plug sleeve, a relatively rich easily ignitable mixture is formed in the ignition chamber although the spark plug electrodes are geometrically disposed outside the fuel cone in the lean mixture area. The flame beam generated in the ignition chamber ignites then the expanding fuel cone with different fuel/air mixture concentration layers in a wide front. In this way, during low load operation of the internal combustion engine wherein asymmetrically distributed mixture concentrations resulting from a streak-like fuel cone are formed, an open layer combustion with little influence on the set combustion parameters is achieved.

In order to make the ignition process in the ignition chamber still less sensitive with regard to the characteristic properties of the fuel cone generated by the fuel injection nozzle during fuel injection, the wall area of the spark plug sleeve collecting the fuel is preferably provided with at least one vent bore. The vent bore extends through the fuel collecting sleeve wall area in radial alignment with the electrodes of the spark plug and fixes the fuel/air mixture in the ignition chamber in a location adjacent the electrodes which is advantageous for good ignition. With the size of the vent bore, the system-specific ignition parameters can be tuned.

The spark plug sleeve is preferably cylindrical and includes a shoulder by which the position of the spark plug sleeve in the cylinder head is determined and which forms on the inside of the spark plug sleeve a seat for a screw head of the spark plug. If the restricted area of the spark plug sleeve between the shoulder and the end of the sleeve forming the ignition chamber includes an internal thread into which the threaded portion of the spark plug can be screwed the electrodes of the spark plug are in their optimal position in the ignition chamber when the spark plug is seated on the sleeve shoulder. In this way, it is made sure that a replacement spark plug is disposed in a simple manner in the predetermined position when it is screwed into the spark plug sleeve.

In anther advantageous embodiment, the injection nozzle is disposed at the nozzle end in an injection nozzle receiving structure such that the injection nozzle is accurately positioned in the combustion chamber. In this position, the injection nozzle axis is disposed co-axially with the piston whereby the formation of an open stratified charge in a combustion chamber which preferably has a cone-like shaped combustion chamber portion formed in the cylinder head is improved. In this case, the inner wall of the cylinder head extends preferably parallel to the fuel mixture cone whereby a layer cone is formed during the compression stroke of the piston and flushing of the combustion chamber by the combustion air introduced into the combustion chamber is improved.

It is advantageous if the injection nozzle receiving structure and the spark plug sleeve engage one another at their inner ends such that they are necessarily properly oriented with respect to one another and the cylinder head can be very compact in its design.

Preferably, the spark plug sleeve includes a recess at its end which defines the ignition chamber and extends axially over the end portion of the injection nozzle receiving structure and into a recess in the injection nozzle receiving structure. To increase the projected entrance area of the ignition chamber to permit the collection of a certain fuel amount derived by the projecting wall portion from the injected fuel mixture cone the recess in the spark plug sleeve portion opposite the fuel collecting wall has the shape of the adjacent part of the front face of the injector as projected in an axial direction of the fuel injection nozzle onto the sparkplug sleeve.

The front face of the pistol surface defining the combustion chamber may be recessed whereby the dimensions of the combustion chamber in the direction of the axis of the injection nozzle is increased. Since in this way, the fuel in the streaks defining the fuel cone have a longer travel path, stratified charge combustion during fuel injection with partial engine load operation is improved and, by forming turbulent squeeze currents, the combustion quality is also improved under full load operation of the engine.

Preferably, the projecting wall portion of the spark plug sleeve extends into the recess of the fuel injection nozzle support structure so that, with a compact combustion chamber, the spark plug that is its electrodes are so arranged that they are protected by the spark plug mounting sleeve. The distance by which the spark plug sleeve projection extends into the combustion chamber that is into the recessed area of the piston and into the fuel mixture cone during fuel injection for the collection of a small amount of fuel can be determined by the angle α between the longitudinal axis of the injection nozzle and the axis of the spark plug sleeve. It is larger than the opening angle of the fuel cone between the cone axis and the cone circumference. Preferably it is between 40° and 75° such that the projection of the spark plug sleeve extending into the fuel mixture cone collects for the ignition chamber maximally 1/30 of the fuel injected by the fuel injection nozzle for forming a relatively rich fuel mixture in the ignition chamber at the electrodes of the spark plug, which can easily be ignited by the spark plug spark.

The volume proportion of the ignition chamber of the total combustion chamber volume is preferably not more than 1/50 in order to facilitate a homogeneous flame propagation in the combustion chamber.

An embodiment of the invention will be described below in detail on the basis of the accompanying drawing.

BRIEF DESCRIPTION OF THE DRAWINGS

The sole FIGURE is a cross-sectional view of a cylinder with a cylinder head of an internal combustion engine with direct fuel injection.

DESCRIPTION OF A PREFERRED EMBODIMENT

A portion 1 of an internal combustion engine as shwon in the FIGURE comprises a combustion chamber 2 which is delineated by a piston 3 which is movably disposed in a cylinder 4, and the inner wall 6 of a cylinder head 5. An injector 7 is arranged in the cylinder head 5 such that its longitudinal axis 16 is co-axial with the piston 3. The injector 7 comprises an injection nozzle 14 for injecting fuel in a cone-like pattern into the combustion chamber 2 where it forms, together with combustion air admitted through intake valves which are not shown in the FIGURE, an ignitable air/fuel mixture. The mixture is ignited by a spark which is generated between the electrodes 9a, 9b of a spark plug 8 projecting into the combustion chamber 2.

In order to insure optimal operation of the internal combustion engine for a long period of operation and furthermore to facilitate a stratified charge in the combustion chamber 2, which can be reliably ignited also at or outside the fuel mixture cone 13, the spark plug 8 is received in a spark plug sleeve 10 which extends into the combustion chamber 2 and protects the spark plug 8 from carbon deposits. At its end projecting into the combustion chamber 2, the spark plug sleeve 10 is provided with an internal thread 21 into which the threaded spark plug shaft 26 is screwed. The insertion depth of the spark plug 8 is determined by a nuthead 20 associated with the threaded spark plug shaft being seated on a shoulder 19 of the spark plug sleeve 10. At the front end of the spark plug sleeve 10 adjacent the combustion chamber 2, the spark plug sleeve 10 includes a section 22 which forms an ignition chamber 12 within which the electrodes 9a, 9b of the spark plug 8 are disposed in such a way that the ground electrode 9b faces the injection nozzle 14.

The cylindrical spark plug sleeve 10 is mounted in the cylinder head 5 inclined at an angle α with respect to the longitudinal axis 16 of the injector 7 wherein the shoulder 19 determines the position of the spark plug sleeve 10 in the cylinder head 5 with respect to the sleeve axis 25. The inclination angle α is larger than the opening angle between the longitudinal axis 16 of the injector and the fuel mixture cone 13 envelope 18 generated by the injection nozzle 14. As a result, a sleeve wall projection 17 of the end portion 22 disposed opposite the infection nozzle 14 projects into the 18 of the fuel mixture cone 13. When fuel is injected by the injection nozzle 14 into the combustion chamber 2 in a cone-like pattern, a part of the fuel-rich mixture carried in the fuel cone envelope 18 of the fuel cone 13 impinges onto the wall projection 17 of the spark plug sleeve 10 from where it is reflected into the ignition chamber 12. Within the ignition chamber 12, the ignitable fuel/air mixture is ignited by a spark generated between the electrodes 9a, 9b, of the spark plug 8, that is, there is an initial ignition in the ignition chamber. After ignition, a flame beam develops in the ignition chamber 12 and is directed toward the combustion chamber 2 wherein it ignites most of the combustible air/fuel mixture on a wide front basis. The electrodes 9a, 9b are arranged outside the fuel cone 13 and accordingly are not wetted by fuel during the injection process so that they remain without carbon deposits over a long period of operation and, consequently, will safely ignite the air/fuel mixture. During stratified charge operation of the internal combustion engine, an easily ignitable mixture is provided at the electrodes 9a, 9b which are disposed outside the cone 13 in an area of a lean fuel/air mixture, since a small amount of the easily ignitable rich fuel mixture is scooped up by the sleeve wall projection 17 and retained in the ignition chamber 12. The mixture scooped up by the sleeve wall projection 17 and contained in the ignition chamber 12 is about 1/30 of the total mixture volume in the combustion chamber 2, whereas the volume of the ignition chamber 12 is less than 1/50 of the combustion chamber volume so that the fuel/air mixture in the ignition chamber is relatively rich.

To provide the desired mixture volume in the ignition chamber 12 in the area of the electrodes 9a, 9b, the spark plug sleeve 10 includes, in the end portion 22 adjacent the sleeve wall portion 17, a vent opening 11, which is disposed essentially in radial alignment with the electrodes 9a, 9b. As a result of the location and the size of the vent opening 12, the mixture quality in the ignition chamber 12 is independent of the various mixture concentrations in the fuel cone 13, which depends on the installation position of the injection nozzle 14 and characteristic properties of the injection nozzle. The characteristic injection nozzle properties are the result of manufacturing tolerances, particularly the streak formation of the fuel emitted from the injection nozzle. As a result, the combustion quality remains essentially unchanged when an injector 7 with an injection nozzle 14 is exchanged. There is no need for the normally necessary tuning.

The part of the combustion chamber 2 adjacent the cylinder head 2 is conical such that the inner wall 6 of the cylinder head 5 extends parallel to the cone envelope 18 of the fuel cone 13. In its front face, adjacent the combustion chamber 2, the piston 3 includes a trough-like recess 24 which expands the combustion chamber 2 and into which the sleeve wall projection 17 of the spark plug sleeve 10 extends. The arrangement provides, in a high engine load operating range, for a turbulent squeeze flow generating a fuel/air mixture which causes a homogeneous combustion. Under partial load, operating conditions however, there will be stratified charge conditions which, with the symmetrical combustion chamber design, provides for improved combustion of the stratified fuel/air charge.

The injector 7 projecting with its injection nozzle 14 centrally into the combustion chamber 2 is supported at its nozzle end in an injector mounting structure 15 which accurately positions the injector. The arrangement facilitates the exchange of the injector when such an exchange should become necessary and the alignment of its injection nozzle. At its end, the injector mounting structure receives the spark plug sleeve 10 such that both components are held in their respective proper angular positions by engagement with one another. The angular position of the spark plug sleeves 10 fixes the position of the sleeve wall projection 17 and of the vent opening 11 and also of the ground electrode 9b.

In order to increase the entrance area of the ignition chamber 12 as projected from the center of the fuel cone 13, the spark plug sleeve 10 has a cutout 23 in the area of the end portion 22 in contact with the injector mounting structure. The shape of the cut-out 23 corresponds to the projection of the spark plug sleeve 10 in the direction of the axis 16 onto the front end of the injector 7 or rather the mounting structure 15.

What is claimed is:

1. An internal combustion engine with direct fuel injection comprising at least one cylinder, a piston movably disposed in said cylinder, a cylinder head with an inner wall mounted on said cylinder and defining with said cylinder and said piston a combustion chamber, an injector with a fuel injection nozzle mounted on said cylinder head such that said injection nozzle projects into said combustion chamber for injecting fuel into combustion air in said combustion chamber to form therein a fuel mixture cone, a spark plug mounted in a spark plug sleeve disposed in said cylinder head and projecting into said combustion chamber, said spark plug sleeve having at its front end an ignition chamber which is open toward said fuel mixture cone, and said spark plug having electrodes disposed in said ignition chamber and said spark plug sleeve having a portion projecting into said fuel mixture cone for collecting a fuel rich mixture therefrom.

2. An internal combustion engine according to claim 1, wherein said spark plug sleeve has an axis disposed in said cylinder head at an angle $\alpha$ with respect to the longitudinal axis of said injector and said sleeve wall projection is disposed opposite said injection nozzle.

3. An internal combustion engine according to claim 2, wherein said sleeve wall projection is formed by an end portion of said spark plug sleeve projecting into said combustion chamber.

4. An internal combustion engine according to claim 2, wherein said electrodes of said spark plug are disposed outside an envelope formed by said fuel mixture cone.

5. An internal combustion engine according to claim 1, wherein said spark plug sleeve is cylindrical and includes a shoulder forming a stop for a nuthead of said spark plug.

6. An internal combustion engine according to claim 5, wherein said spark plug sleeve is provided, between said shoulder and said ignition chamber, with an internal thread into which a threaded shaft of said spark plug is screwed.

7. An internal combustion engine according to claim 2, wherein said sleeve wall projection includes at least one vent opening arranged in radial alignment with said electrodes.

8. An internal combustion engine according to claim 1, wherein said injector is mounted in an injector mounting structure disposed in said cylinder lead at the injection nozzle end of said injector.

9. An internal combustion engine according to claim 8, wherein said injector mounting structure and said spark plug sleeve are in engagement with one another.

10. An internal combustion engine according to claim 9, wherein a portion of said spark plug sleeve which engages said injector mounting structure has a cutout section corresponding to the cross-section of the injector and said spark plug sleeve is engaged in a cutout in the injector mounting structure.

11. An internal combustion engine according to claim 1, wherein said combustion chamber has a cone-shaped portion extending into said cylinder head.

12. An internal combustion engine according to claim 11, wherein said cone-shaped portion of said cylinder head has an internal wall extending parallel to said fuel cone.

13. An internal combustion engine according to claim 1, wherein said injector is arranged in said cylinder head in coaxial relationship with said piston.

14. An internal combustion engine according to claim 1, wherein said piston has adjacent said combustion chamber a front surface which includes a recess.

15. An internal combustion engine according to claim 14, wherein said sleeve wall projection of said spark plug sleeve extends into said recess.

16. An internal combustion engine according to claim 2, wherein said spark plug sleeve has an axis at an angle $\alpha$ which is greater than the angle between said cylinder axis and said fuel cone envelope.

17. An internal combustion engine according to claim 16, wherein said angle $\alpha$ is between 40 and 75°.

18. An internal combustion engine according to claim 1, wherein said sleeve wall projection scoops up, and collects in, the injection chamber at most $1/30$ of the fuel injected by the injection nozzle.

19. An internal combustion engine according to claim 1, wherein the volume of said ignition chamber is at most $1/50$ of the total combustion chamber volume.

* * * * *